(12) United States Patent
Edwards et al.

(10) Patent No.: US 9,118,784 B2
(45) Date of Patent: Aug. 25, 2015

(54) SCANNER AND PROCESS FOR DETECTING A SCAN LID OPEN CONDITION

(71) Applicant: Lexmark International, Inc., Lexington, KY (US)

(72) Inventors: Mark Joseph Edwards, Lexington, KY (US); John Paul NeCamp, II, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 12 days.

(21) Appl. No.: 13/728,077

(22) Filed: Dec. 27, 2012

(65) Prior Publication Data

US 2014/0185102 A1   Jul. 3, 2014

(51) Int. Cl.
  *G06K 15/00* (2006.01)
  *H04N 1/00* (2006.01)
  *H04N 1/40* (2006.01)

(52) U.S. Cl.
  CPC ......... *H04N 1/00045* (2013.01); *H04N 1/0005* (2013.01); *H04N 1/00013* (2013.01); *H04N 1/00037* (2013.01); *H04N 1/00063* (2013.01); *H04N 1/00076* (2013.01); *H04N 1/00551* (2013.01); *H04N 1/40056* (2013.01)

(58) Field of Classification Search
  USPC .......................... 358/1.9, 1.5, 514, 406, 408
  See application file for complete search history.

(56) References Cited

U.S. PATENT DOCUMENTS

| | | | | |
|---|---|---|---|---|
| 5,513,017 | A * | 4/1996 | Knodt et al. | 358/471 |
| 6,094,689 | A * | 7/2000 | Embry et al. | 710/5 |
| 7,995,254 | B2 * | 8/2011 | Edwards et al. | 358/497 |
| 2005/0157319 | A1 * | 7/2005 | Mizuhashi et al. | 358/1.9 |
| 2009/0027743 | A1 * | 1/2009 | Han | 358/498 |
| 2010/0053706 | A1 * | 3/2010 | Jasinski et al. | 358/498 |

* cited by examiner

*Primary Examiner* — Jamares Q Washington
(74) *Attorney, Agent, or Firm* — John Victor Pezdek (57) ABSTRACT

A scanner and process for detecting a scan lid open condition. The scan lid open condition is detected by aligning two scan bars with one another, illumining one of the scan bars with a predetermined illumining pattern and during the illumining, scanning the illumined scan bar with the other scan bar. The response of the scanning scan bar is compared with an expected response for the illumining pattern with the scan lid closed. If a positive comparison occurs, the scan lid is closed. If a negative comparison occurs, the scan lid is open.

21 Claims, 8 Drawing Sheets

SCANNER AND PROCESS FOR DETECTING A SCAN LID OPEN CONDITION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners and scanning methods, and more particularly to those having two scan bars and detecting a scan lid open condition.

2. Description of the Related Art

Prior art methods of scanner lid open sensing include using a scanner lid switch, or using special pixels within the lower scan bar to sense a change in ambient light while the scan bar carrier is motionless, indicating that the scan lid has been lifted or closed. The switch and additional special pixels increase the cost of the scanner.

SUMMARY

Provided is a scanner comprising a housing having a base and a scan lid openable with respect to the base. The base comprises a platen, a first scan bar translateably mounted below the platen, and a drive for translating the first scan bar. The scan lid comprises a second scan bar with the first and second scan bars being alignable with one another. A user interface is mounted to one of the base and the scan lid. A controller is provided in the scanner and is configurable to control operation of the first and second scan bars, the drive, and the user interface. The controller is configured to: align the first and second scan bars with one another; illumine one of the first and second scan bars using a predetermined illumining pattern and perform a scan of the illumined scan bar with the other of the first and second scan bar; compare the response of the scanning scan bar with an expected response for the predetermined illumining pattern with the scan lid closed; and upon a negative comparison, concluding that the scan lid is open. The controller may be configured to align the first scan bar in an optimum position with respect to the second scan bar.

Also provided is a process for detecting and responding to a scan lid open condition of a scanner having a pair of scan bars. The process comprises: aligning the pair of scan bars with one another; illumining one scan bar of the pair of scan bars using a predetermined illumining pattern and performing a scan of the illumined scan bar with the other scan bar of the pair of scan bars; comparing the response of the scanning scan bar with an expected response for the predetermined illumining pattern with the scan lid closed; and upon a negative comparison, concluding that the scan lid is open.

Further the process may provide that upon a negative comparison, a corrective action is taken. The corrective action includes at least one of activating a scan lid open alert, suspending operation of an ADF, and inhibiting operation of the ADF.

In a further form upon a negative comparison, the process may determine if an image to be scanned has been placed in the scanner and upon a positive determination that an image to be scanned has been placed in the scanner, selecting one of the pair of scan bars to perform the scanning of the image and performing a calibration of the selected one scan bar of the pair of scan bars and then performing a scan of the image with the selected and calibrated scan bar of the pair of scan bars, and upon a negative determination that no image has been placed in the scanner, performing a corrective action.

The predetermined illumining pattern may be a time varying pattern or a spatial varying pattern. Further aligning the pair of scan bars may comprise moving one scan bar of the pair of scan bars to an optimum position with respect to the other scan bar of the pair of scan bars.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back", "rear" and "side" "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The present disclosure provides a method for determining an open scan lid condition in a scanner having a first and second scan bar. The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output.

Figure 1:
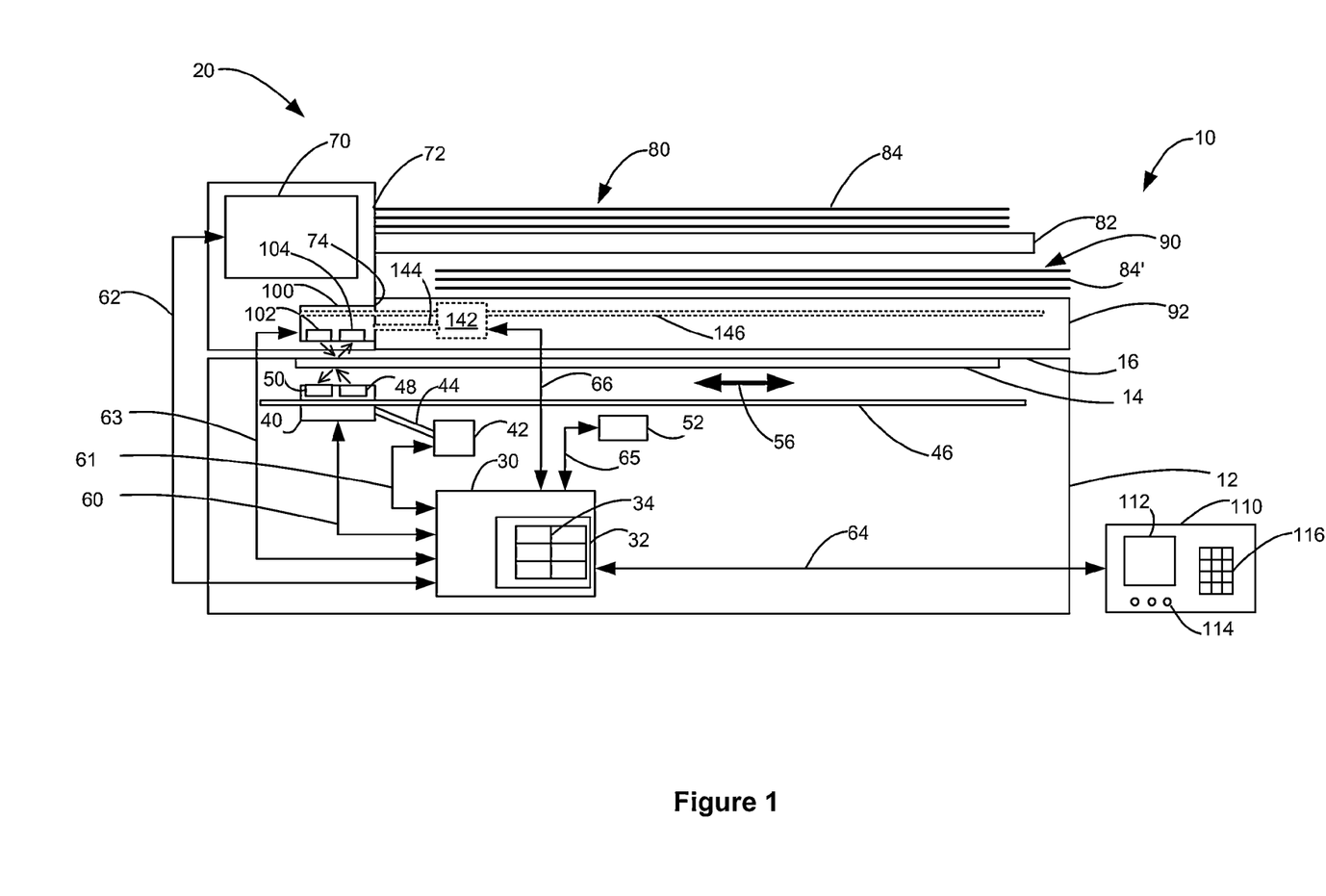
FIG. 1 is a schematic illustration of a scanner utilizing the present invention.

Shown in FIG. 1 is a schematic illustration of an example scanner. Scanner 10 may be a stand alone scanner or be part of a multifunction device having printing and copying capabilities. Scanner 10 includes a base 12 having a platen 14 incorporated into an upper surface 16 thereof. A scan lid 20 is moveably attached to base 12 and moveable between an open position where scan lid 20 is raised away from platen 14 and a closed position, as shown, where scan lid 20 covers platen 14. Platen 14 is transparent and holds a media sheet having an image to be scanned. Within base 12 are a controller 30, having a memory 32, a first scan bar 40, a scan bar drive motor 42, a drive transmission 44, and a document sensor 52. Drive motor 42 is operatively coupled to drive transmission 44 that in turn is used to translate first scan bar 40 beneath platen 14 along the length of platen 14 on a pair of spaced parallel rails 46 mounted in base 12 when scanning an image placed on platen 14. First scan bar 40 includes a light source 48 and a photoreceptor array 50. Document sensor 52 may be used to determine if an image to be scanned has been placed on platen 14. The arrangement of platen 14 and first scan bar 40 is also referred to as a flatbed scan bar.

Under direction of controller 30, first scan bar 40 moves, in a bi-directional scan direction indicated by arrow 56, along at least a portion of the length of the platen 14. Scan bar 40 under direction of controller 30 illuminates and scans a scan line on the bottom surface of media placed on platen 14. As used herein "bottom surface" refers to that surface of the media being scanned that is in contact with the upper surface of platen 14. As illustrated, the scan area and scan lines are directed orthogonally into the plane of the page on which FIG. 1 is shown. The scan area is sized to handle various sizes of media such as A4, Letter, Legal or Ledger sized media, or smaller.

Scan lid 20 includes an automatic document feeder (ADF) 70, an input media area 80, an output media area 90, and a second scan bar 100. An input media support 82 extends from the input 72 of ADF 70 and provides input media area 80 where media 84 having images to be scanned are placed. An output media support 92 extends from the output 74 of ADF 70 and provides output media area 90 for the scanned media 84'. Second scan bar 100 also includes a light source 102 and a photoreceptor array 104. Second scan bar 100 is carried by scan lid 20 and moved away from platen 14 as scan lid 20 is raised. If scan lid 20 is partially ajar or raised, scanning performance will be affected. Second scan bar 100 is also referred to as an ADF scanner.

A similar drive arrangement as shown for first scan bar 40 may also be provided for second scan bar 100 provided in scan lid 20 so that scan bar 100 may also be translated to scan an image placed on platen 14. Drive motor 142 is operatively coupled to a drive transmission 144 that in turn is used to translate second scan bar 100 above platen 14 along the length of platen 14 on a pair of spaced parallel rails 146 mounted in scan lid 20.

A user interface 110 may be provided for scanner 10. User interface 110 comprises a display 112, such as a touch screen, a plurality of indicator lights 114, and a key pad 116. Display 112 and key pad 116 may be used to provide input to controller 30. For example, a user may select single sided or duplex scanning, or color or monochrome scanning Display 112 and indicator lights 114 may be used to provide information about the functioning and status of scanner 10 to a user. User interface 110 is operatively coupled to controller 30 and may be mounted to base 12 or to scan lid 20.

Controller 30 may be formed, for example, as an application specific integrated circuit (ASIC), and may include a processor, such as a microprocessor, and associated memory 32. Memory 32 may be any volatile or non-volatile memory or combination thereof such as, for example, random access memory (RAM), read only memory (ROM), flash memory and/or non-volatile RAM (NVRAM). Alternatively, memory 32 may be in the form of a separate electronic memory (e.g., RAM, ROM, and/or NVRAM), a hard drive, a CD or DVD drive, or any memory device convenient for use with controller 30. Memory 32 may be used to store program instructions for execution by controller 30 that control operation of scanner 10. Memory 32 may also be configured to provide a look up table 34.

Controller 30 is communicatively coupled to scan bar 40 and scan bar drive motor 42 via communication links 60, 61, respectively. Controller 30 is communicatively coupled to ADF 70 via communication link 62. Controller 30 is communicatively coupled to scan bar 100 via communication link 63. Controller 30 is communicatively coupled to user interface 110 via communication link 64. Controller 30 is communicatively coupled to document sensor 52 via communication link 65. If drive motor 142 is provided for second scan bar 100, controller 30 is communicatively coupled to drive motor 142 via communication link 66. As used herein, the term "communication link" generally refers to a structure that facilitates electronic communication between two components, and may operate using wired or wireless technology. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Although separate communication links are shown between controller 30 and the other controlled elements, a single communication link can be used to communicatively couple the controller 30 to all of the controlled elements such as first and second scan bars 40, 100, drive motor 42, document sensor 52 and user interface 110.

Controller 30 executes program instructions stored in memory 32 to effect the scanning of an image on media 84. For example, where duplex scanning is selected, scanner 10 would have media 84 fed through ADF 70 from media input area 80 to pass between first and second scan bars 40, 100 where the top and bottom surfaces are scanned and then out to media output area 90. Similarly, if multiple sheets of media were to be one-sided or simplexed scanned, the sheets of media may be placed in media input area 80 and fed through ADF 70 and past scan bar 100 or scan bar 40, depending on the design of scanner 10, and out to output media area 90. If media were placed on platen 14, controller 30 would, using scan drive motor 42, cause scan bar 40 to translate along rails 46 to scan the bottom surface of the media.

First scan bar 40 may be a contact image sensor (CIS) scan bar or an optical reduction scan bar. Second scan bar 100 may be a CIS scan bar or an optical reduction scan bar. First scan bar 40 may be an optical reduction scan bar while second scan bar 100 may a CIS scan bar and vice versa. In other words the first and second scan bars 40, 100 do not have to be of the same type.

Where either first scan bar 40 or second scan bar 100 is a CIS scan bar, light source 48 or light source 102 is typically an array of red, green and blue light emitting diodes (LEDs) and photoreceptor array 50 or 104 would be a corresponding array of phototransistors. A lens array 49, 103 may be positioned in the reflected light path between the photoreceptor array 50, 104 and the image being scanned (see FIGS. 2-3). Light arrays 48, 102 may consist of 600, 1200, 2400 or 4800 LEDs (depending on resolution) and span the width of a scan area of scanner 10. Photoreceptor array 50, 104 may consist of 600, 1200, 2400 or 4800 photoreceptors per inch (depending on resolution), and span the width of a scan area of scanner 10. If either first or second scan bars 40, 100 is a CIS scan bar, it would be placed very close to the surface of platen 14.

Another more typical version of light sources 48, 102 used in a CIS scan bar has a single set of red, green and blue LEDs in combination with light guides to provide illumination of the scan line of the image to be scanned. The illuminated image is then captured by the row of photoreceptor sensors. Monochrome scanning is typically done by illumining only the green LED during scanning. Color scanning is done by illuminating each color type of LED separately and taking a sub-scan line of each color for each resultant scan line of the image and then combining the three sub-scans to form a color resultant scan line image. This is repeated for all scan lines down the length of the original image to create the full two dimensional scan image.

Where first or second scan bar 40, 100 is an optical reduction type scan bar, a combination comprised of a light source 48, 102, an optical system 49, 103, and a CCD (Charge Coupled Device) array serving as photoreceptor arrays 50, 104 is used. The CCD array 50, 104 is a collection of tiny, light-sensitive diodes, which convert photons into electrons. These diodes are called photosites—the brighter the light that hits a single photosite, the greater the electrical charge that will accumulate at that site. Light source 48, 102, such as a fluorescent bulb or row of white LEDs, illuminates the document being scanned. The light reflected from the document reaches the CCD array 50, 104 through optical system 49, 103, comprised of a series of mirrors, filters and lenses. The exact configuration of these components will depend on the model of scanner and their design and implementation is well known to one of ordinary skill in the art. Some optical reduction scanners use a three pass scanning method. Each pass uses a different color filter (red, green or blue) between the lens array 49, 103 and CCD array 50, 104. After the three passes are completed, program instructions programmed into controller 30 allow controller 30 to assemble the three filtered images into a single full-color image. Most optical reduction scanners use the single pass method. The lens splits the image into three smaller versions of the original. Each smaller version passes through a color filter (either red, green or blue) onto a discrete section of the CCD array 50, 104. Again the controller 30 combines the data from the three parts of the CCD array into a single full-color image.

Figure 2:
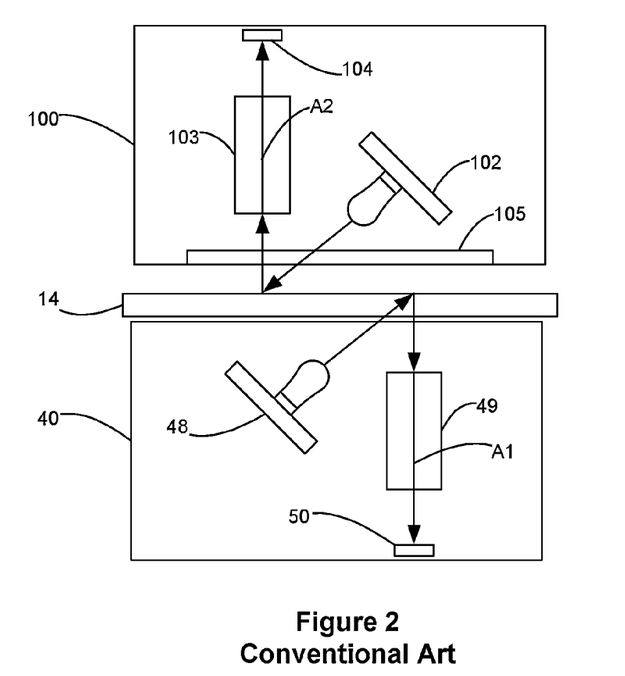
FIG. 2 is a schematic illustration of a conventional scan bar alignment arrangement.
Figure 3:
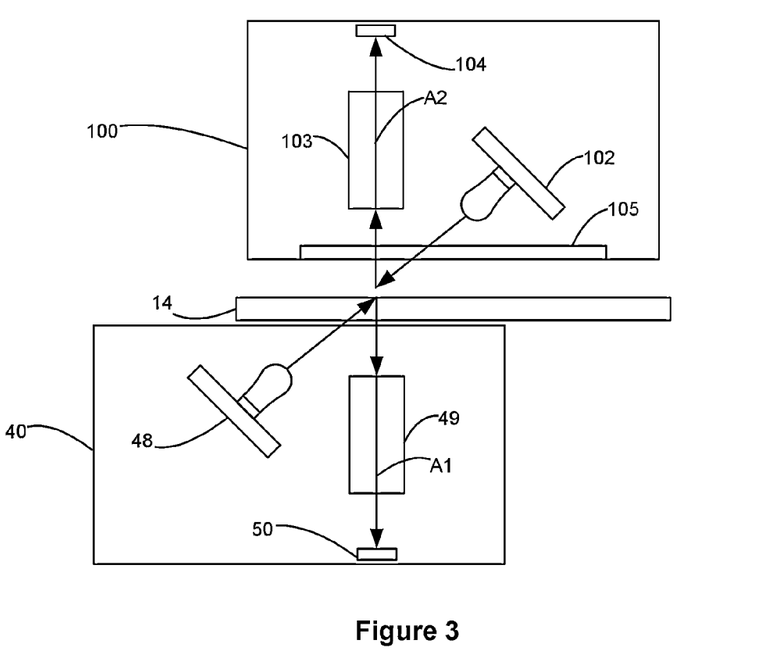
FIG. 3 is a schematic illustration of an optimum scan bar alignment arrangement.
Figure 4:
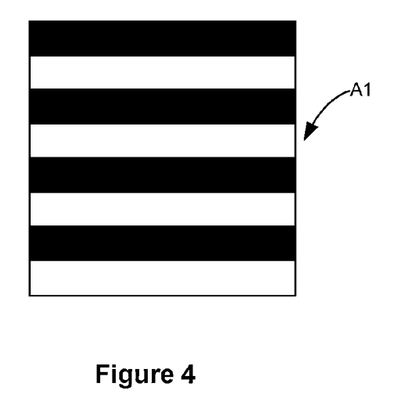
FIG. 4 is an illustration of a response of a scanning scan bar to a time varying illumining pattern for a scan lid closed condition.

FIGS. 2-3 illustrate two scan bar alignment positions that may be used with the process disclosed herein. Although these figures show CIS scan bars, optical reduction scan bars could be equivalently used in place of or in combination with the illustrated CIS scan bars. FIG. 2 illustrates a conventional art alignment between scan bar 40 and scan bar 100. Also shown in scan bar 100 is a cover glass 105 that is used to seal scan bar 100 to protect the components therein. Scan bar 40 may also have a cover glass but as it is positioned within base 12 beneath platen 14, it is sufficiently protected. As shown in FIG. 2, scan bar 40 is in alignment with scan bar 100. However, the photoreceptor arrays 50, 104 and their respective optical axes A1, A2 that extend through lens arrays 49, 103, are offset from one another and their respective lights sources 48, 102 are focused to illuminate platen 14 at two spaced apart positions that are off axis from the optical axes A1, A2 of the photoreceptor arrays 50, 104. The processes described later will function with such a conventional arrangement. Shown in FIG. 3 is what is considered to be an optimal alignment position of scan bars 40, 100. There the two photoreceptor arrays 50, 104 and their optical axes A1, A2 are aligned with the lights sources 102, 48, respectively, illumining the platen at approximately the same point that is aligned with the optical axis of the photoreceptor array of the opposing scan bar. In other words, the phrase "optimum alignment position" is one where the illumining scan bar is positioned so that the light therefrom is maximized along the optical axis of the scanning scan bar.

In order to detect a lid open condition a variety of illumining patterns may be used with the scan bars stationary and aligned as discussed previously. With either CIS or optical reduction scan bars, the resulting scan combines the many individual R, G, and B sub-scan lines (for instance, in 300 ppi (pixels per inch) resolution, there are 300 R, 300 G, 300 B sub-scan lines per inch scanned down the page) into a resultant two dimensional scan image, which is just the color image of what the scan bar saw over the distance scanned down the page. Since each scan bar is at stationary position and if nothing is moving in the field of view of each scan bar, each scan bar will just record the same line information (whatever light it sees) repetitively.

The scanning done by the scanning scan bar may be done for a predetermined number of sub-scan lines or for a predetermined time period. The quantitative value of the number of sub-scan lines or the time period is dependent on the design, and scan line scan speed. At least one sub-scan line needs to be scanned in order to detect a scan lid open condition. This may take about 0.25 msec. To cover a range of different scan bars, a range of about 1 to about 5 sub-scan lines may be used to detect a scan lid open condition corresponding to a time range of about 0.25 msec to 1.25 msec. Longer time periods may be used, for example, the length of time to scan the length of the scan area. For a scan area designed to scan letter or A4 media, this would be about 3.3 seconds. A "scan line" may be a single scan line or consist of two or more sub-scan lines that are combined to form a "scan line". As used herein scan line may refer to either a scan line or one of more sub-scan lines.

Referring now to FIGS. 4-7, say, for example, scan bar 100 (the upper scan bar) is the scanning scan bar that "views" the light source 48 of scan bar 40 (the lower scan bar), the illumining scan bar, with scan lid 20 closed. Next, the lower light source 48 of scan bar 40 cycles between being off and on while scan bar 100 scans for a predetermined number of sub-scan lines or alternatively a predetermined time period.

Figure 5:
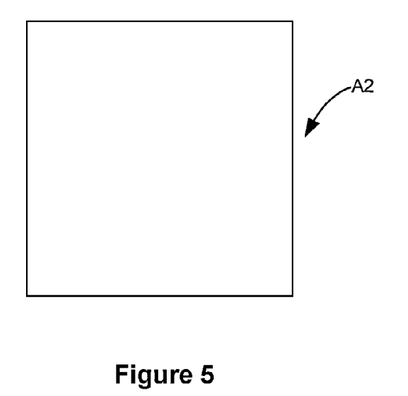
FIG. 5 is an illustration of a response of a scanning scan bar to a time varying illumining pattern for a scan lid open condition.

In FIGS. 4-7, where the scan bar 40, 100 is an optical reduction type scan bar, a fluorescent white light or row of white LEDs is being cycled off and on, or for a CIS type scan bar off-on cycles of the red, green and blue LEDs takes place (which are later combined into 'white' in the resultant scan). A time varying illumining pattern like this may result in a response from scan bar 100 that looks like response A1, a pattern of alternating horizontal bands, white when light source 48 is on, black when light source 48 is off. If scan lid 20 is up or open, the resultant response A2 of scan bar 100 will be a pattern of constant to color, such as a grayish color and stippling as shown in FIG. 5. There may also be some white or dark or horizontally cyclical gray colors in response A2, but not alternating light and dark bands as shown in pattern A1 of FIG. 4. Because of this difference in the output responses A1, A2 of the scanning scan bar between scan lid closed and open conditions, the cover is open if an output response of the scanning scan bar is different from the closed lid response such as response A1 shown in FIG. 4. This describes a time varying illumining pattern and the response to it.

As previously mentioned, there are several types of light sources. Fluorescent lamps light all white across the width of the scan line. CIS scan bars typically use a scan line wide light guide that distributes light from three LEDs (one red, one green, one blue) at one end of the light guide across the width of the scan line. Another LED type light source for use with CCD type photoreceptors in optical reduction scanners uses a plurality of white LEDs (for example nine white LEDs) positioned equally across the width of the scan bar, and with some lenses and diffusers (not shown), smoothly and evenly illuminate across the width of the scan line when all nine LEDs are on.

Figure 6:
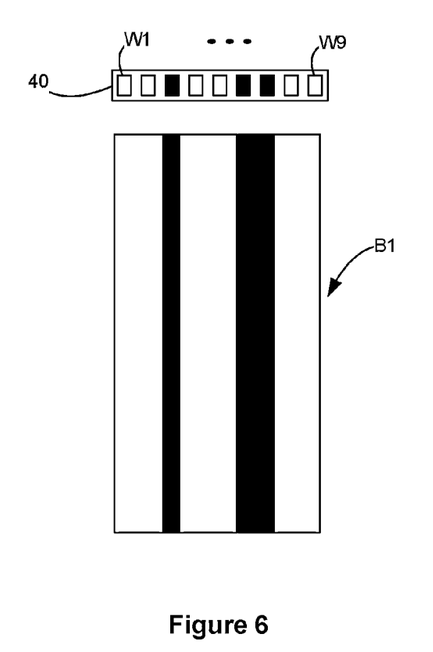
FIG. 6 is an illustration of a response of a scanning scan bar to a spatial varying illumining pattern for a scan lid closed condition.
Figure 7:
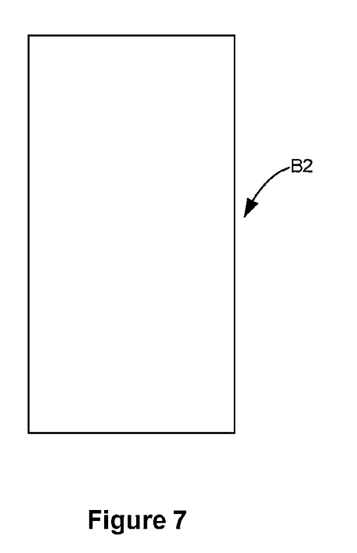
FIG. 7 is an illustration of a response of a scanning scan bar to a spatial varying illumining pattern for a scan lid open condition.

Again say, for example, scan bar 100 (the upper scan bar) is the scanning scan bar that views light source 48 of scan bar 40 (the lower scan bar), the illumining scan bar, with scan lid 20 closed. Next light source 48 is illumined with a predetermined illumination pattern where some of the above described white LEDs are turned on while others are turned off but are not cycled off and on. Scan bar 100 scans scan bar 40 for a predetermined time period or number of scan lines. In FIG. 6, scan bar 40 is schematically shown with white LEDs W3, W6, W7 unillumined or deenergized while white LEDs W1, W2, W4, W5, W8 and W9 are illumined or energized. Below scan bar 40 in FIG. 6 is the output response B1 of the scanning scan bar 100 to the illumining pattern shown on scan bar 40 that consists of vertically alternating strips of light and dark—light where the corresponding LED on scan bar 40 is illumined and dark where the corresponding LED on scan bar 40 is unillumined If scan lid 20 is raised or open, the resultant response B2 is again some more constant color, grayish as shown in FIG. 7. Response B2 may also contain white or dark or vertically cyclically gray, but not alternating, well defined, vertical light and dark strips of response B1 shown in FIG. 6. Again, if the output response of the scanning scan bar is very different from the closed lid response such as, for example, response B1 shown in FIG. 6, the conclusion would be that scan lid 20 is open. The illumining pattern used in FIG. 6 is a spatially to varying illumining pattern.

Figure 8:
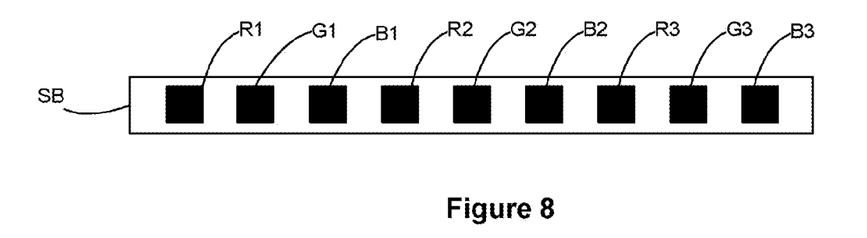
FIG. 8 is a schematic illustration of an unillumined scan bar having a plurality of red, blue and green LEDs.
Figure 9:
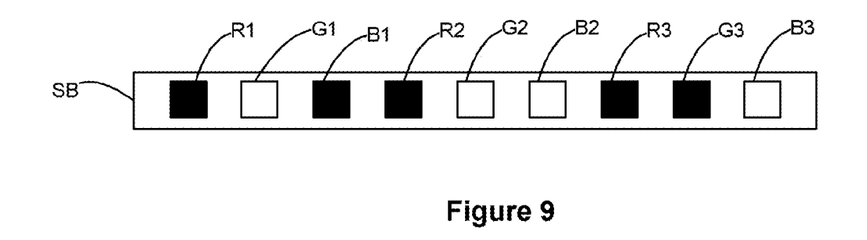
FIG. 9 is an illustration of an illumined scan bar of FIG. 8 having a plurality of red, blue and green LEDs illumined in a predetermined pattern.
Figure 10:
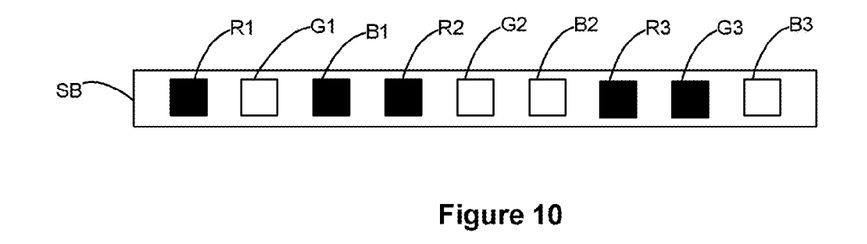
FIG. 10 is an illustration of the scanned image of the illumined scan bar of FIG. 3 taken by a second scan bar with the lid of the scanner closed.
Figure 11:
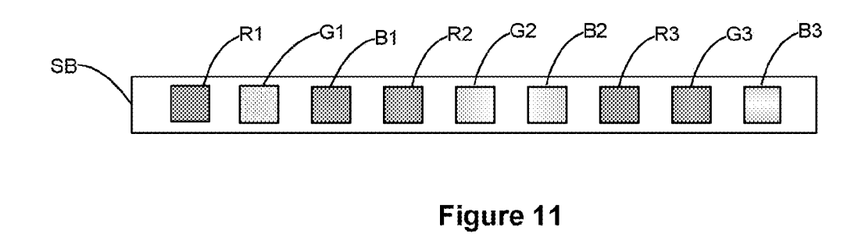
FIG. 11 is an illustration of the scanned image of the illumined scan bar of FIG. 3 taken by a second scan bar with the lid of the scanner open.

FIG. 8 illustrates one of first scan bar 40 or second scan bar 100, generally designated SB, having at least one red, one green and one blue LED, generally designated R, G, B, respectively. This general designation will be applied to both first and second scan bars 40, 100 unless specific reference is made to first or second scan bars 40, 100. As illustrated there are red LEDs R1-R3, green LEDs G1-G3, and blue LEDs B1-B3. In FIG. 8 the LEDs are depicted as unillumined or turned off. FIG. 9 illustrates red LEDs R1, R2, R3, blue LED B1 and green LED G3 unillumined while the remaining LEDs are illumined FIG. 10 illustrates a response of the scanning scan bar to the illumined scan bar SB of FIG. 9 taken by the other of the two scan bars with scan lid 20 closed. FIG. 11 illustrates a response of the scanning scan bar of the illumined scan bar SB of FIG. 9 taken by the other of the two scan bars with scan lid 20 open. As can be seen with scan lid 20 closed, the scan of scan bar SB that is depicted closely resembles the illumined scan bar SB of FIG. 9. With scan lid 20 open, the scan of scan bar SB that is depicted does not resemble the illumined scan bar SB of FIG. 9. The scan depicted in FIG. 11 indicates that most if not all of the LEDs appeared to be illumined With scan lid 20, open the ambient light typically contains all three colors, red green and blue, so the photoreceptor array in the other of the scan bars will pick up all three colors. That is why the response is not as crisp as in the image where the scan lid 20 is closed. With scan lid 20 closed, the photoreceptor array of the other scan bar will only see only the red, blue, and green pattern of illumined scan bar SB.

Figure 12A:
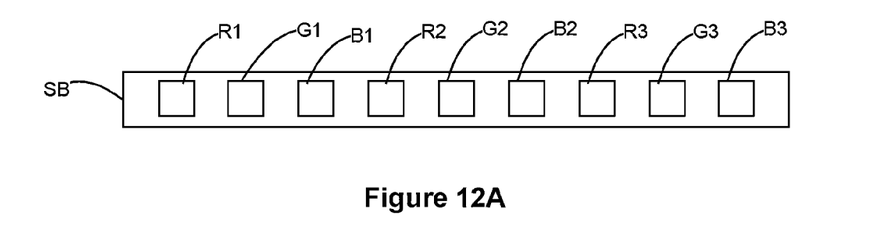
FIGS. 12A-12D illustrate various spatial varying illumining patterns.
Figure 12B:
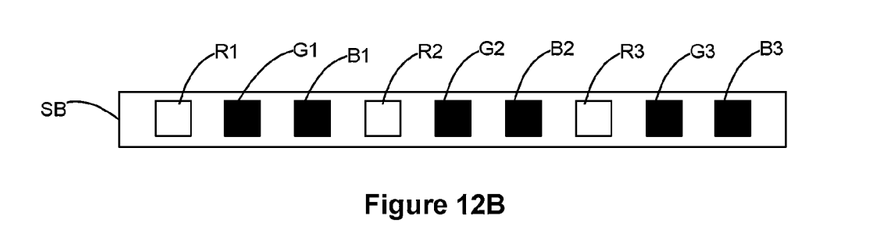
Figure 12C:
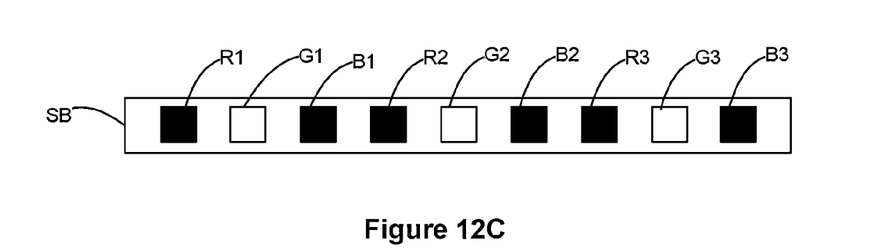
Figure 12D:
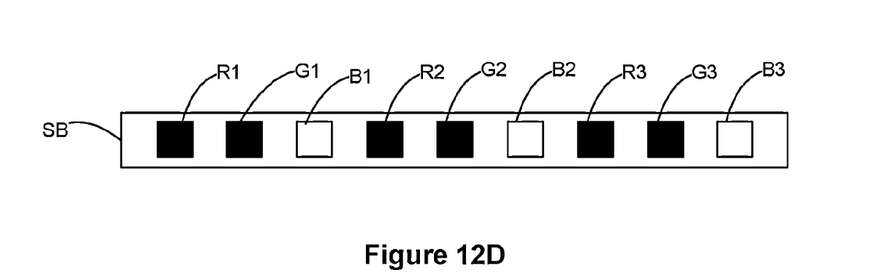
Figure 13:
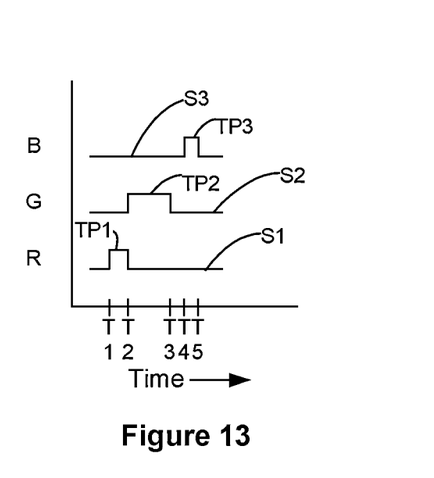
FIG. 13 is a sequenced illumining pattern used to illumine a first scan bar.
Figure 14:
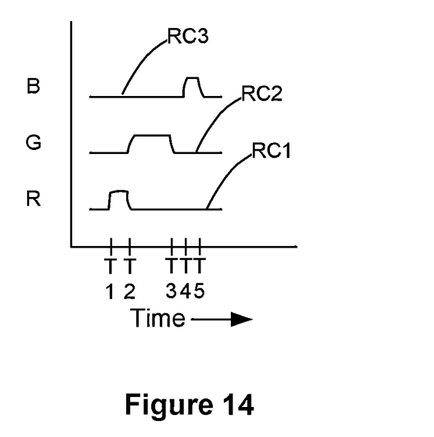
FIG. 14 is a depiction of the response of a second scan bar to the illumining pattern of the first scan bar of FIG. 13 taken with the scan lid closed.
Figure 15:
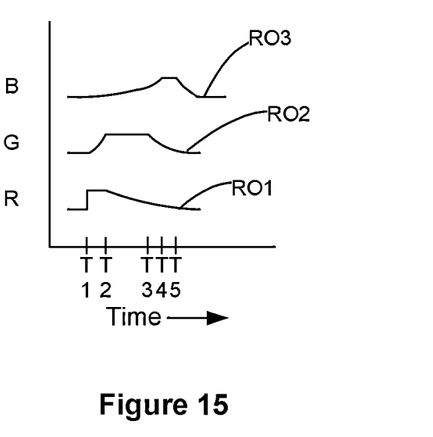
FIG. 15 is depiction of the response of a second scan bar to the illumining pattern of the first scan bar of FIG. 13 taken with the scan lid open.

FIGS. 12A-12D illustrate other predetermined illumining patterns. In FIG. 12A all of the LEDs are illumined, in FIG. 12B only the red LEDs are illumined, in FIG. 12C only the green are illumined and in FIG. 12D only the blue LEDs are illumined The illumining patterns shown in FIGS. 9 and 12A-12D are examples of spatial illumining patterns where a predetermine number and pattern of LEDs are illumined FIGS. 13-15 illustrate time varying illumining patterns. The timing and colors used is a matter of design choice. In FIG. 13, three LEDs are shown, a red LED, R, a green LED, G and a blue LED, B. These three LEDs would be in one of the two scan bars, 40, 100 provided in scanner 10. At time T1 red LED R is illumined for time period TP1 ending a time T2 when it is deillumined as shown in signal S1. In signal S2 at time T2, green LED G is illumined for a time period TP2 ending a time T3 when it is deillumined From time T3 to T4 all three LEDs are unillumined As shown in signal S3, at time T4, blue LED B is illumined for a time TP3 ending at time T5 where it is deillumined Time periods TP1, TP2, TP3 are arbitrary as well as the illumining sequence that is used for the three LEDs. Any one, any two or all three of red green and blue LEDs R, G, B may be used in a time varying illumining pattern.

FIG. 14 depicts a scan of the scan bar performing the illumining pattern of FIG. 13 by the other scan bar in scanner 10 with scan lid 20 closed while FIG. 15 depicts a scan of the scan bar performing the illumining pattern of FIG. 13 by the other scan bar in scanner 10 with scan lid 20 open. In FIG. 14 the responses RC1, RC2, RC3 of the photoreceptor array of the other scan bar with scan lid 20 closed to signals S1, S2, S3, respectively, closely resemble the sequential variable timing pattern of FIG. 13 while the responses RO1, RO2, RO3 of the photoreceptor array of the other scan bar with scan lid 20 open to signals S1, S2, S3, respectively, depicted in FIG. 15 is more diffuse and less distinct where the LEDs change state from unillumined to illumined and back again. Again, with scan lid 20 open, the ambient light typically contains all three colors—red green and blue—so the photoreceptor array in the other scan bar will pick up all three colors, resulting in a response that is not as crisp as in the image where scan lid 20 is closed.

It should be realized that when the illumining patterns of one scan bar are being scanned by the other scan bar, the light source of the other scan bar performing the scan does not need to be illumined. Also the illumining patterns used are a matter of design choice. Because the illumining pattern can be predetermined and the expected response is known then a comparison of these can be used to determine that state of scan lid 20 is either opened or closed.

Figure 16:
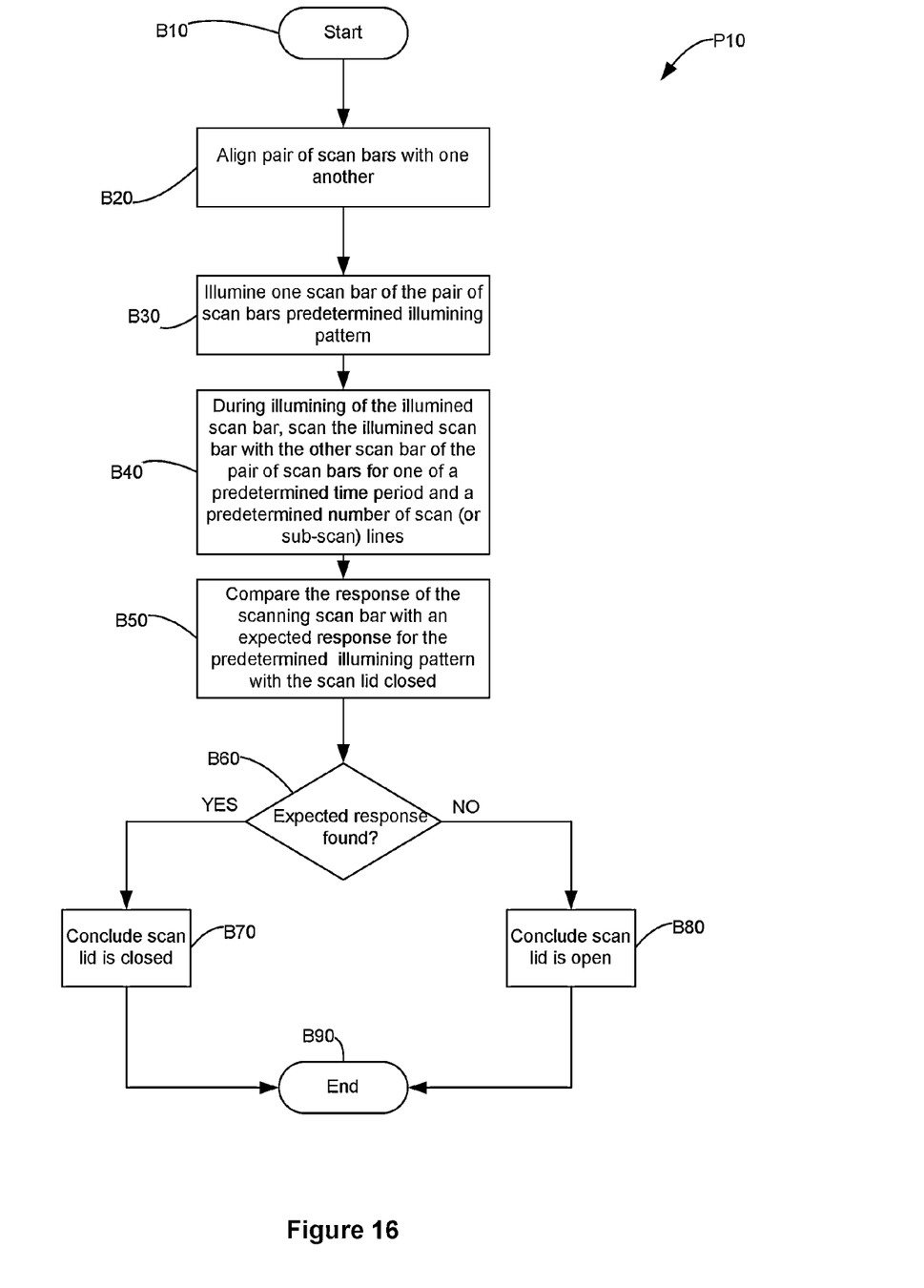
FIG. 16 is a flow chart of one example embodiment of detecting an open scan lid condition.

Referring now to FIG. 16, a process P10 for determining the state of the scan lid 20 is shown. The process P10 is started at block B10. At block B20, a pair of scan bars is aligned with one another by controller 30. In one form the scan bars may be aligned at the optimum position previously described. At block B30, one scan bar of the pair of scan bars is illumined with a predetermined illumining pattern. At block B40 during illumining of illumined scan bar, the illumined scan bar is scanned by the other scan bar of the pair of scan bars under direction of controller 30 for one of a predetermined time period and a predetermined number of scan (or sub-scan) lines. At block B50, process P10 compares the response of the other scan bar that has performed the scan with an expected response for the to predetermined illumining pattern with the scan lid 20 being closed. The predetermined pattern, and the expected response for the predetermined pattern may be stored in the look up table 34 in memory 32 of controller 30. At block B60, the process P10 determines if the expected response is found. If YES, then process P10 proceeds to block B70 where it is concluded that the lid is closed. A next scanner operation may then be performed. This next scanner operation may include performing a calibration on one or both of the scan bars in the pair of scan bars. If NO, process P10 at block B80 concludes that the scan lid is open. A corrective action may then be performed. The corrective action may be one or more actions such as providing a message or image on touch screen 112 showing or stating that the scan lid 20 is open, activating an alert indicator 114 for scan lid open, or suspending or inhibiting operation of ADF 70. The process P10 ends at block B90.

Figure 17:
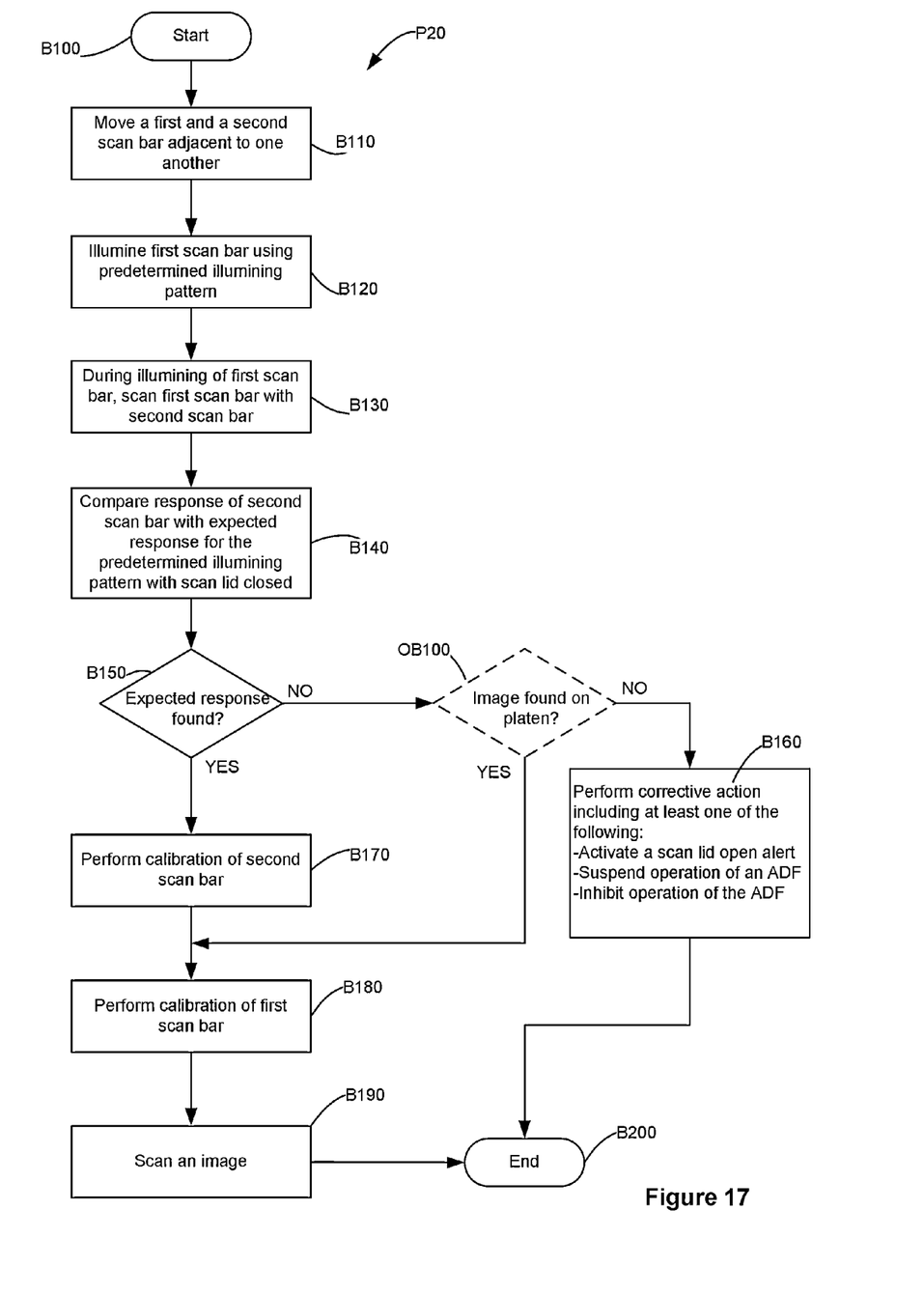
FIG. 17 is a flow chart of another example embodiment of detecting an open scan lid condition.

Shown in FIG. 17 is flow chart of process P20 depicting a further embodiment of an illumining process of a scan bar in a scanner. Process P20 starts at block B100. Process P20 proceeds to block B110 where a first and second scan bar 40, 100 are moved adjacent to one another. The first and second scan bars 40, 100 are placed so that light from light source 48 of first scan bar 40 is within the field of view of photoreceptor array 104 of second scan bar 100, or light from light source 102 of second scan bar 100 is within the field of view of photoreceptor array 50 of first scan bar 40, or that light sources 48, 102 are within the respective field of view of photoreceptor arrays 104, 50.

At block B120, the first scan bar is illumined using a predetermined illumining pattern. At block B130, during the illumining of the first scan bar, the second scan bar scans the first scan bar. At block B140, process P20 then compares the response of the second scan bar with an expected response for the predetermined illumining pattern with the scan lid being closed. Proceeding to block B150, process P20 determines if the expected response has been found.

In process P20 after a positive determination has been made at block B150, controller 30 has determined that scan lid 20 is closed and the scanner is ready to perform a scanning operation using the ADF. At block B170, process 20 performs a calibration of the second scan bar and then proceeds to block B180 to perform a calibration of the first scan bar. This action at block B180 may be optional and used when duplex scanning of the image is to be done. Thereafter, process P20 proceeds to block B190 to perform a scan of the image. The scan may be either a simplex or a duplex scan. Thereafter, process P20 proceeds to block B200 where process P20 ends.

In process P20 after a negative determination has been made at block B150, optional activities may be performed. Because it has been determined at block B150 that scan lid 20 is open, process P20 may infer or sense that an image to be scanned has been placed on platen 14 in which case first scan bar 40 will be used and a calibration of first scan bar 40 may be performed prior to scanning the image on platen 14. Document sensor 52 may provide a signal to controller 30 indicating an image is present on platen 14 or first scan bar 40 may be activated to perform a preliminary scan of platen 14 to locate the image to be scanned. At optional block OB100, a determination is made if an image has been sensed on platen 14. If YES, process P20 proceeds to block B180 where a calibration of first scan bar 40 is performed and then to block B190 where a scan of the image is done. If NO, process 20 proceeds to block B160 where one or more corrective actions are undertaken. These corrective actions include activating a scan lid open alert, suspending operating of an ADF, and inhibiting operation of the ADF. Thereafter, process P20 ends at block B200.

For processes P10, P20, the illumined scan bar may be scan bar 40 found in base 12 (also referred to as the flat bed scan bar) or may be scan bar 100 found in the scan lid 16 (also referred to as the ADF scan bar). While scan bar 100 is shown as being fixed, scan bar 100 may also be translateable along the length of platen 14 and may be used to scan images placed on the platen as well as image placed in the ADF.

What is claimed is:

1. A scanner comprising:
   a housing having a base and a scan lid openable with respect to the base;
   the base comprising:
      a platen;
      a first scan bar translateably mounted below the platen, the first scan bar having first light source having a plurality of LEDs; and
      a drive for translating the first scan bar;
   the scan lid comprising:
      a second scan bar with the first and second scan bars being alignable with one another, the second scan bar having a second light source having a plurality of LEDs;
   and
   a controller configurable to control operation of the first and second scan bars, and the drive, the controller configured to:
      align the first and second scan bars with one another;
      turn on the respective light source in one of the first and a second scan bars and directly illuminate the other of the first and second scan bars using a predetermined illumining pattern of light produced by one or more of the LEDs in the plurality of LEDs in the respective light source;
      perform, with the other of the first and second scan bars, a scan of the turned-on one of the first and second scan bars and the predetermined illuminq pattern of light thereof;
      compare the response of the scanning scan bar with an expected response for the predetermined illumining pattern with the scan lid closed; and
      upon a negative comparison, conclude that the scan lid is open.

2. The scanner of claim 1 wherein the controller is further configured to align the first scan bar in an optimum position with respect to the second scan bar.

3. The scanner of claim 1 further comprising:
   an automatic document feeder (ADF) mounted in the scan lid;
   a media input area on the scan lid to feed media to be scanned into the ADF; and
   a media output area on the scan lid to receive scanned media from the ADF with the controller being further configured in the event the scan lid open condition is detected to direct the ADF to do one of suspend operation and inhibit operation.

4. The scanner of claim 1 wherein the controller is further configured in the event of the scan lid open condition to determine if an image to be scanned has been placed on the platen, and, upon a positive determination that an image has been placed on the platen, select one of the first and second scan bars to perform the scanning of the image and perform a calibration of the selected scan bar and perform a scan of the image with the selected and calibrated scan bar, and upon a negative determination that no image has been placed in the scanner, perform a corrective action.

5. The scanner of claim 1 wherein the controller is further configured to provide a time varying illumining pattern to the illumined scan bar.

6. The scanner of claim 1 wherein the controller is further configured to provide a spatial varying illumining pattern to the illumined scan bar.

7. The scanner of claim 2 wherein the first scan bar is a flatbed scan bar in the base and the second scan bar is in the scan lid adjacent the ADF.

8. A process for detecting and responding to a scan lid open condition of a scanner having a pair of scan bars, the process comprising:
   aligning the pair of scan bars with one another, each scan bar having a light source having a plurality of LEDS;
   turning on the respective light source in one scan bar of the pair of scan bars and directly illuminating the other scan bar of the pair of scan bars using a predetermined illumining pattern of light produced by one or more of the LEDS in the plurality of LEDs in the respective light source;
   performing a scan of the turned-on scan bar with the other scan bar of the pair of scan bars;
   comparing the response of the scanning scan bar with an expected response for the predetermined illumining pattern with the scan lid closed; and
   upon a negative comparison, concluding that the scan lid is open.

9. The process of claim 8 wherein upon the negative comparison, performing a corrective action.

10. The process of claim 9 wherein performing the corrective action includes at least one of activating a scan lid open alert, suspending operation of an ADF, and inhibiting operation of the ADF.

11. The process of claim 8 wherein upon the negative comparison, determining if an image to be scanned has been placed in the scanner and upon a positive determination that an image to be scanned has been placed in the scanner, selecting one of the pair of scan bars to perform the scanning of the image and performing a calibration of the selected one scan bar of the pair or scan bars and then performing a scan of the image with the selected and calibrated scan bar of the one scan bar of the pair of scan bars, and upon a negative determination that no image has been placed in the scanner, performing a corrective action.

12. The process of claim 8 wherein the predetermined illumining pattern is a time varying pattern.

13. The process of claim 8 wherein the predetermined illumining pattern is a spatial varying pattern.

14. The process of claim 8 wherein aligning the pair of scan bars further comprises moving one scan bar of the pair of scan bars to an optimum position with respect to the other scan bar of the pair of scan bars.

15. A process for detecting a scan lid open condition of a scanner having a first and second scan bar, each scan bar having a light source having a plurality of red LEDs, blue LEDs and green LEDs, the method comprising:
   moving the first scan bar and the second scan bar adjacent to one another;
   turning on the light source in the first scan bar and directly illuminating the second scan bar using a predetermined illumining pattern of light produced by predetermined illuminated and un-illuminated ones of the plurality of red LEDs, green LEDs and blue LEDs in the light source of the first scan bar;
   performing a scan of the first scan bar by the second scan bar;
   comparing a response of the second scan bar with an expected response to the predetermined illumining pattern with the scan lid closed; and
   upon a negative comparison, concluding that the scan lid is open.

16. The process of claim 15, further comprising upon the negative comparison, performing a corrective action including at least one of providing a scan lid open alert, suspending operation of an ADF, and inhibiting operation of the ADF.

17. The process of claim 15, further comprising, upon a positive comparison, calibrating at least one of the first scan bar and second scan bar and then scanning an image.

18. The process of claim 15 wherein the predetermined illumining pattern is a spatial varying pattern.

19. The process of claim 15 wherein the predetermined illumining pattern is a time varying pattern.

20. The process of claim 15, further comprising upon the negative determination, determining if an image to be scanned is placed on a platen in the scanner and, upon a positive determination that an image has been placed on the platen, calibrating the first scan bar and then scanning the image with the first scan bar.

21. The process of claim 15, wherein the first scan bar is a flatbed scan bar in a base of the scanner and the second scan bar is in an openable scan lid of the scanner.

* * * * *